Dec. 26, 1933.  J. A. TEACH  1,941,117
INDICATING DEVICE FOR PUNCH TABLES
Filed Dec. 16, 1930  2 Sheets-Sheet 1

INVENTOR
Jacob A. Teach
by Edward A. Lawrence
his Attorney

Dec. 26, 1933.　　　J. A. TEACH　　　1,941,117
INDICATING DEVICE FOR PUNCH TABLES
Filed Dec. 16, 1930　　2 Sheets-Sheet 2
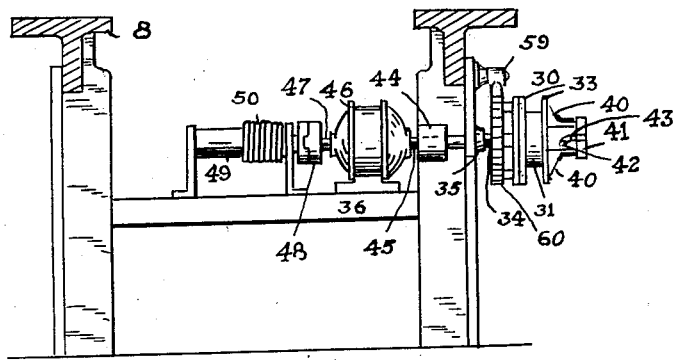
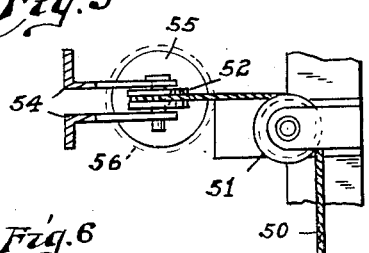
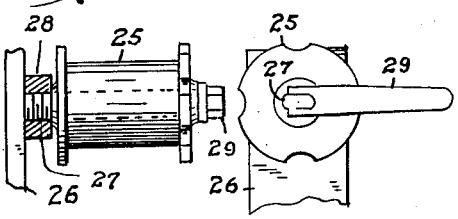
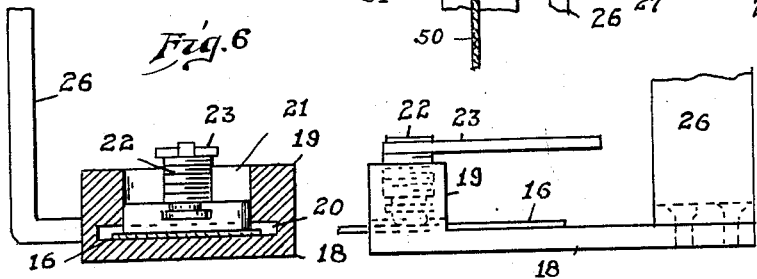
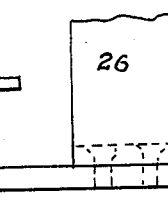
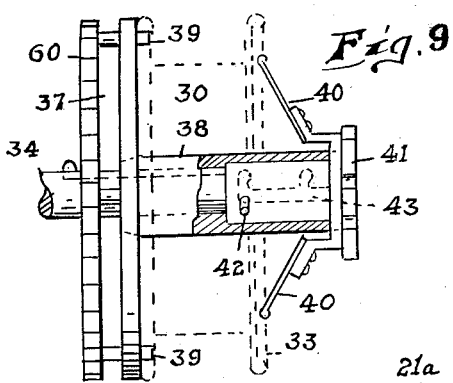
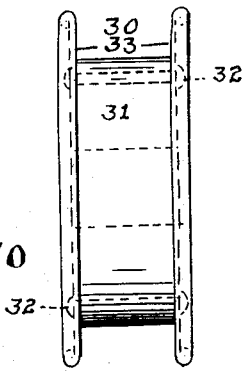
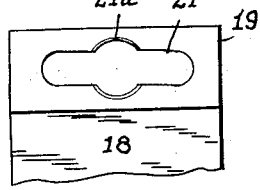
INVENTOR
Jacob A. Teach,
by Edward A. Lawrence,
his attorney.

Patented Dec. 26, 1933

1,941,117

UNITED STATES PATENT OFFICE 1,941,117

INDICATING DEVICE FOR PUNCH TABLES

Jacob A. Teach, Chicago, Ill., assignor, by mesne assignments, to McClintic-Marshall Corporation, a corporation of Pennsylvania Application December 16, 1930
Serial No. 502,700

5 Claims. (Cl. 164—87)

In the present practice of punching holes in structural shapes, such as angles, beams and the like, the shape to be punched is moved along the spacing table of the punching machine by means of a carriage to which the beam is attached at its front end, which carriage in turn engages stops that are positioned along the line of travel of the carriage in such manner as to halt the beam relative to the punch mechanism where it is desired to punch holes in the beam.

Frequently but a single hole or a pair of holes are to be punched at a particular location on the beam whereas at other points it is desired to punch several holes. The punching mechanism is so arranged that one or more holes may be punched simultaneously by the operation of suitable gags or back-up blocks for the individual punches, and it is to indicate to the punch-operator the arrangement of holes to be punched at a particular location on the beam that this invention has for its particular object.

In the case of spacing tables employing stationary templets to indicate the location and arrangement of the holes to be punched and wherein the carriages are manually operated, the templet-maker indicates on the templet the locations and arrangements of the holes to be punched.

In the case of spacing tables whose carriages are automatically operated and stationary templets are used, different colored lights signal the punch-operator as to what punches to be operated. These lights are operated from the carriage.

In the case of some spacing tables moving templets are employed, the same comprising a relatively long and narrow wooden board which moves along the spacing table in unison with the carriage. In such case no signals are necessary as the templet may be observed by the punch-operator.

The use of wooden templets in connection with spacing tables is unsatisfactory for a number of reasons. For instance, in punching long beams and the like, it is necessary to splice two or more boards together to secure the necessary length of templet, thus inevitably resulting in inaccuracies and in weakness in the long wooden templet. Again, wood, being subject to atmospheric conditions tends to lose its shape, thus distorting the spacing laid out by the templet maker. Again, wooden templets are hard to handle and are subject to breakage, and are bulky to store.

To overcome these and other objections I have provided a new and improved templet made of flexible material such as a steel tape and arrange it so that it is unwound and travels with the beam under the observation of the punch operator, the surface of the flexible templet being marked to indicate the locations and arrangement of the holes to be punched.

Other novel features of construction, and also of arrangement of parts, will appear from the following description.

In the accompanying drawings, wherein I have illustrated a practical embodiment of the principles of my invention, Fig. 1 is a broken side elevation of a punching mechanism and spacing table to which my invention has been applied.

Fig. 2 is a sectional detail on enlarged scale taken along the line 2—2 in Fig. 1 and showing the templet spool.

Fig. 3 is an enlarged sectional detail taken along the line 3—3 in Fig. 1.

Fig. 4 is an enlarged detail in side elevation of the take-up reel mounted on the carriage.

Fig. 5 is an end view of the same looking from the right in Fig. 5.

Fig. 6 is an enlarged detail in vertical section of the clamp used to attach the front end of the templet to the carriage.

Fig. 7 is a detail in side elevation looking from the right in Fig. 6.

Fig. 8 is a top plan view of a portion of the structure illustrated in Figs. 6 and 7 but with the screw clamp removed.

Fig. 9 is an enlarged side elevation of a portion of the structure illustrated in Fig. 2, with the templet spool indicated in dotted lines, to illustrate the method of removably mounting a templet spool in the mechanism.

Fig. 10 is an elevation of the templet spool.

Figure 1:
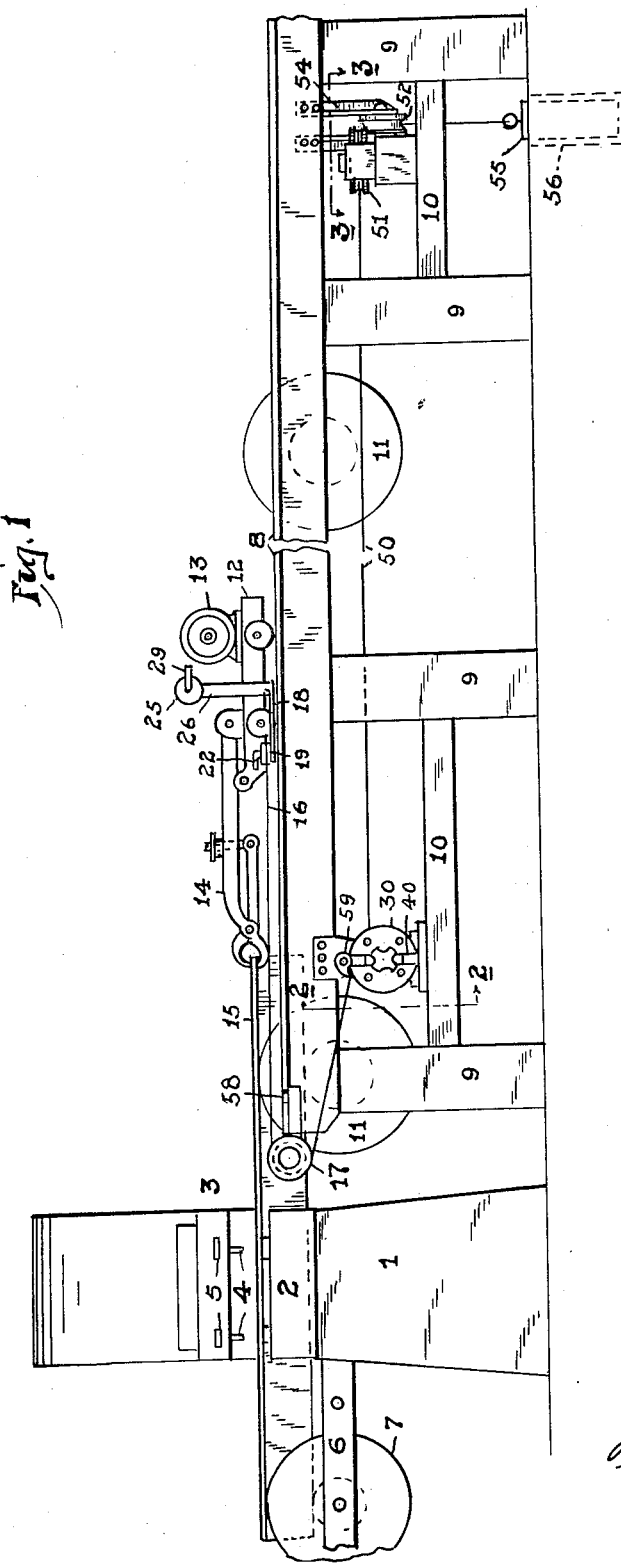

Referring to the drawings, the punching mechanism is indicated by the base 1, the punching table 2, the head 3, the punches 4 and the gags 5. 6 represents the feed table having rollers 7.

The spacing table is indicated by the longitudinal beams 8, the vertical supports 9, the horizontal under beams 10 and the rollers 11 upon which the beam or other shape to be punched moves. 12 represents a carriage arranged to travel along the spacing table and driven as by the motor 13.

The carriage is provided with means for attaching the beam, angle or other shape to be punched. Thus I have shown the tongs 14 which are attached to an angle 15 to be punched.

The templet which is a flat tape of flexible material of proper durability, such as a steel-tape is indicated at 16. The sight or upper face of the tape is finished with a black surface, such as blackboard material, so that the templet maker may mark with chalk or other suitable material the location and arrangement of the holes.

The templet 16 is wound on a spool which is removably mounted in a convenient location, as for instance beneath the front end of the spacing table and the end of the tape is led up around a pulley 17 mounted at the front end of the table and at the side of the table whereat the punch operator stands. The templet is led from the pulley 17 and attached to the side of the carriage 12.

Thus I may attach to the carriage a bracket 18 which extends laterally from the carriage and has mounted thereon a clamp block 19 provided with a horizontally elongated or slotted opening 20 through which the templet is threaded and drawn to the proper extent. The slot 20 is intersected from above by the horizontally elongated opening 21 whose center is enlarged to form a vertical interrupted bolt hole 21a which is threaded to secure the threaded clamping bolt 22. The bolt 22 is provided with a radially disposed handle 23. When the templet has been threaded and drawn through the block to the proper extent, the bolt is screwed down on the templet and the latter is thus clamped to the carriage.

In the case where there is a surplus length of templet which is not to be used for indicating punchings, as for instance where short shapes are to be punched the layout for which is at an intermediate portion of the templet the excess of templet is wound up on a take-up reel 25 which is mounted on the upper end of a post 26 rising from the bracket 18. The reel 25 is mounted on a spindle 27 whose one end is threaded to be screwed into a threaded hole in a boss 28 on the post 26 while its other and outer end is provided with a radially disposed handle 29. By backing off the spindle in the boss the reel 25 is free to rotate in taking up or paying off the templet, and by screwing in the spindle the reel is jambed stationary.

The templet spool 30 is composed of a cylindrical wooden drum 31 to either side of which is attached, as by the through rivets 32, the steel disks 33 which form the sides of the spool.

34 represents a horizontally disposed shaft which is journaled in a bearing 35 carried by a portion of a supporting frame 36, and keyed on the outer end of said shaft is a double disk 37 which is provided with an outwardly extending tubular hub 38. The spool 30 is slipped onto the said hub and is clutched to the double disk 37 by pins 39 protruding from the outer face of said disk and engaging holes in the inner end of the spool. The spool is detachably held in place by the pressure of the flaring fingers 40 attached to the head of a bushing 41 which is telescoped into the end of the hub and held in place by its pins 42 engaging bayonet slots 43 in the hub. By providing more than one pair of said slots spools of different widths can be mounted in place.

The inner end of the shaft 34 is connected by a universal joint 44 to the shaft 45 of a speed reducing mechanism 46 mounted on the support 36. The mechanism 46 is also provided with a shaft 47 which is connected by the flexible coupling 48 with a cable windlass 49 horizontally journaled on the frame 36.

A cable 50 has its front end wound on the windlass and extends rearwardly under the spacing table and around the pulley 51 which is journaled on a vertical axis and down over the pulley 52 journaled on a horizontal axis in a rear frame 54. The end of the cable supports a counterweight 55 which is suspended in a shallow pit 56.

58 represents a pointer mounted on the side of the spacing table and overhanging the templet at a point convenient to the vision of the punch operator.

In practice the templet maker marks with chalk along the length of the templet the location and arrangement of the holes which are to be punched and the marked templet is then taken to the punch shop and stretched along the spacing table and the stops are placed in the proper position. The templet is then wound on the spool and the spool is mounted on the shaft 34. The end of the templet 16 is then drawn from the spool and run over the pulley 17 and clamped to the carriage in such manner that the first templet marking on the tape is in line with the puncher's pointer when the carriage trigger is against the first stop. The pointer is located at a convenient place on the table frame under the eyes of the operator and far enough from the pulley 17 so that the operator has exposed to his vision two or more of the stop markings.

The location of the pointer is important, as it enables the operator to read the templet ahead and gag his punches on the upstroke of the punch and thus on the average job of close spacing the punch clutch may be constantly engaged and punching done on every stroke of the punch.

As the templet is unwound from its spool by the travel of the carriage, the counterweight is raised, the speed reducer proportioning the movement of the weight to that of the templet at approximately one to twenty, so that for each twenty feet of travel of the tape the weight rises a foot.

The counterweight is arranged to impose a tension of say ten pounds on the tape, thus insuring its rewinding on the spool during a reverse travel of the carriage.

To prevent accidental rewinding of the templet I provide a pawl 59 pivotally mounted on the spacing table beam and arranged when in one position, that shown in Figs. 1 and 2, to trail over the toothed perimeter 60 of the double disk 37 as the templet unwinds but engaging the teeth and preventing accidental rewinding. When the templet is to be rewound, the pawl is thrown into its reversed or retracted position.

Among the advantages of my invention may be mentioned the following.

The punching is done more accurately because variations in atmospheric temperature and/or moisture do not affect the length of the layout or the spacing of the holes as is the case in the use of rigid templets such as those made of wood. Again the puncher has before his eyes at each stoppage the information necessary for properly gagging his punches. Moreover the punching operation is less expensive as the puncher may gag his punches on the upstroke and thus punch at every stroke on average work. Again because in the use of automatic carriages the puncher's helper may be at the back of the punching mechanism getting additional material ready for the next operation.

Furthermore flexible tape templets are easier and more convenient to lay out than rigid templets and are more convenient and less bulky to handle and store. Moreover the setting of carriage stops is more convenient and may be done more accurately.

What I claim is:—

1. The combination with punching mechanism, a spacing table, a carriage to which the work is attached and arranged to travel and cause the work to be moved along the spacing table and a templet comprising a flexible tape of suitable material and marked to indicate the locations and arrangement of the holes to be punched in the work, the free end of the templet being attached to the carriage, of means on the carriage for taking up a portion of the front end of the templet which contains no markings to be used in the operation at hand.

2. The combination with punching mechanism, a spacing table, a carriage to which the work is attached and arranged to travel and cause the work to be moved along the spacing table and a templet comprising a flexible tape of suitable material and marked to indicate the locations and arrangement of the holes to be punched in the work, the free end of the templet being attached to the carriage, of a take-up reel on the carriage for taking up a portion of the front end of the templet which contains no markings to be used in the operation at hand.

3. The combination with a punching mechanism, a templet comprising a flexible tape of suitable material and marked to indicate the location of the holes to be punched, said templet being arranged to move with the work, a spool upon which said templet is wound and from which it is rewound as the work moves relative to the punching mechanism, means comprising a cable and weight arranged to rewind the templet on the spool after use, and a speed reducing device interposed between the spool and said rewinding means.

4. The combination with punching mechanism, a templet comprising a flexible tape of suitable material and marked to indicate the location of the holes to be punched, said templet being arranged to move with the work, of a spool mechanism for dispensing said templet as the work moves and comprising a support, a shaft journaled in said support, said shaft having a tubular portion, a spool detachably mounted on said tubular portion, and a spring contact member detachably fixed in said tubular portion and engaging said spool to hold it on said shaft.

5. The combination with punching mechanism, a templet comprising a flexible tape and marked to indicate the location of the holes to be punched, said templet being arranged to move with the work, of a spool mechanism for dispensing said templet as the work moves and comprising a support, a shaft journaled in said support, said shaft having a tubular portion with spaced slots therein, a spool detachably mounted on said tubular portion, and a spring contact member mounted on said tubular portion and engaging said spool for retaining the spool on the shaft, said contact member having a pin adapted to engage a slot in said tubular portion, whereby spools of different widths can be mounted on said shaft

JACOB A. TEACH.